United States Patent
Baker

(10) Patent No.: US 9,581,259 B2
(45) Date of Patent: Feb. 28, 2017

(54) METHOD OF INSTALLING AN EMERGENCY FLOW RESTRICTOR DEVICE (EFRD) ON A PIPELINE

(71) Applicant: Maverick Supervision Inc., Fort St. John (CA)

(72) Inventor: William Baker, Fort St. John (CA)

(73) Assignee: Maverick Supervision Inc., Fort St. John, BC (CA)

(*) Notice: Subject to any disclaimer, the term of this patent is extended or adjusted under 35 U.S.C. 154(b) by 0 days.

(21) Appl. No.: 14/674,237

(22) Filed: Mar. 31, 2015

(65) Prior Publication Data
US 2015/0276117 A1 Oct. 1, 2015

Related U.S. Application Data

(63) Continuation-in-part of application No. 14/250,631, filed on Apr. 11, 2014.

(30) Foreign Application Priority Data

Apr. 1, 2014 (CA) ..................................... 2847778

(51) Int. Cl.
*E03B 3/00* (2006.01)
*E03B 7/00* (2006.01)
(Continued)

(52) U.S. Cl.
CPC ............ *F16K 17/20* (2013.01); *F16L 55/105* (2013.01); *F16K 1/00* (2013.01); *Y10T 137/0441* (2015.04);
(Continued)

(58) Field of Classification Search
CPC .... F16L 55/105; F16K 1/00; Y10T 137/0469; Y10T 137/0441;
(Continued)

(56) References Cited

U.S. PATENT DOCUMENTS 3,948,282 A 4/1976 Yano
6,357,471 B1 3/2002 Sato et al.
(Continued)

FOREIGN PATENT DOCUMENTS

GB 2041129 A 9/1980
JP 3292492 A 12/1991

OTHER PUBLICATIONS

NLB Corporation; Ultra-High Pressure Abrasives Water-Jet Cutting; 2003; http://nlbcorp.com/wp-content/uploads/2012/07/Abrasive-Cutting.pdf.*

(Continued)

*Primary Examiner* — Kevin Murphy
*Assistant Examiner* — Kelsey Rohman
(74) *Attorney, Agent, or Firm* — Davis & Bujold PLLC; Michael J. Bujold

(57) ABSTRACT

A method of installing an Emergency Flow Restrictor Device (EFRD) on a pipeline without stopping the flow of fluid through the pipeline includes the steps of: assembling first and second face plates on a pipeline such that the first and second sealing face are in face to face, spaced relation; assembling a cutting device between the first face plate and the second face plate; assembling a valve body that has an access opening on a length of pipeline such that the valve body encloses the first and second face plates and the cutting device; installing an access valve on the access opening; operating the cutting device to sever the pipeline between the first and second sealing faces; retracting the cutting device and severed section of pipeline; and attaching a valve gate member of the EFRD to the access opening.

6 Claims, 20 Drawing Sheets

(51) Int. Cl.
*E03B 9/00* (2006.01)
*E03B 11/00* (2006.01)
*F16K 43/00* (2006.01)
*F16K 51/00* (2006.01)
*F16L 1/024* (2006.01)
*F16L 55/10* (2006.01)
*F16L 55/18* (2006.01)
*F17C 13/00* (2006.01)
*B23B 41/08* (2006.01)
*F16K 3/00* (2006.01)
*F16K 17/20* (2006.01)
*F16L 55/105* (2006.01)
*F16K 1/00* (2006.01)

(52) U.S. Cl.
CPC .... *Y10T 137/0447* (2015.04); *Y10T 137/0458* (2015.04); *Y10T 137/0463* (2015.04); *Y10T 137/0469* (2015.04); *Y10T 137/0486* (2015.04); *Y10T 137/0514* (2015.04)

(58) Field of Classification Search
CPC ......... Y10T 137/0447; Y10T 137/0458; Y10T 137/0463; Y10T 137/0486; Y10T 137/0514

USPC ......... 137/15.08, 15.09, 15.12, 15.13, 15.14, 137/15.17, 15.23, 317, 318, 320, 322
See application file for complete search history.

(56) References Cited

U.S. PATENT DOCUMENTS

| | | |
|---|---|---|
| 6,622,747 B2 | 9/2003 | Sato et al. |
| 7,225,827 B2 | 6/2007 | Maichel et al. |
| 8,726,928 B2 | 5/2014 | Sato |
| 2002/0106247 A1* | 8/2002 | Russell ................ F16L 55/124 405/158 |
| 2004/0222399 A1* | 11/2004 | Maichel ............... F16K 3/0272 251/326 |
| 2006/0243326 A1* | 11/2006 | Calkins .................. F16L 41/06 137/318 |
| 2014/0166119 A1 | 6/2014 | Murphy et al. |

OTHER PUBLICATIONS

NLB Corp., "Ultra-High Pressure Abrasives Water-Jet Cutting", 2 pages-at least as early as 2003.

* cited by examiner

METHOD OF INSTALLING AN EMERGENCY FLOW RESTRICTOR DEVICE (EFRD) ON A PIPELINE

FIELD

There is described a method of installing an Emergency Flow Restrictor Device (EFRD) on a pipeline, without stopping the flow of fluid through the pipeline.

BACKGROUND

Leaks from pipelines have caused environmental damage and much adverse publicity. The reaction from the pipeline companies and government regulators is to propose the installation of an Emergency Flow Restrictor Device (EFRD) at intervals along each pipeline. Through use of the EFRD, sections of pipeline can be isolated to limit the amount of leakage to a damaged section.

The installation of EFRD along existing pipelines is slowly progressing. The current method used to install an EFRD (Emergency Flow Restrictor Device) valve is quite cumbersome as it requires a great deal of preparation work and expense. It also requires stopping the flow of the pipeline (called an outage) for about 24 hours (or installing a temporary bypass line and 2 more stopples). Without the bypass line it is very difficult to coordinate an outage date, often taking as much as a month. Even when an outage has been approved, there is the problem of meeting the installation deadline. The deadline is very strict (there is enormous money at stake) so the supervisor is forced to have everything he might need on site. Because so much extra equipment must be on site it requires a huge parking area (and because the pipelines cross mostly private land) it usually means placing an enormous amount of wooden mats to prevent soil damages. Of course the safety challenges of working crews around the clock, and under a tight timeline, are much greater as well. What is required is a method that will enable an EFRD to be installed without stopping the flow of fluid through the pipeline

SUMMARY

There is provided a method of installing an Emergency Flow Restrictor Device (EFRD) on a pipeline. A first step involves providing a first face plate having two or more segments that, when assembled, circumscribe the pipeline and a second face plate having two or more segments that, when assembled, circumscribe the pipeline. A second step involves assembling and welding the first face plate in place encircling the pipeline and the second face plate encircling the pipeline, in face to face relation to the first face plate. A third step involves assembling a circular cutting wheel around the pipeline between the first face plate and the second face plate. A fourth step involves providing a valve body having two or more segments that, when assembled, enclose the pipeline, the first face plate, the second face plate and the cutting wheel, the valve body having an access opening. A fifth step involves assembling and welding the valve body in place around the pipeline, the first face plate, the second face plate and the cutting wheel, the valve body being capable of containing fluids at pipeline pressures. A sixth step involves installing an access valve on the access opening, the access valve having an open position and a closed position, objects can be passed through the access valve when in the open position. A seventh step involves securing a cutting tower to the access valve, moving the access valve to the open position and lowering a drive linkage from the cutting tower through the access valve to engage the cutting wheel. An eighth step involves driving the cutting wheel, by means of the drive linkage, to sever a section of the pipeline between the first face plate and the second face plate. A ninth step involves retracting the drive linkage into the cutting tower, pulling the cutting wheel and severed section of pipeline inside the cutting tower. A tenth step involves closing the access valve to enable the cutting tower to be removed. An eleventh step involves installing a control section of the EFRD (the bottom having a converter flange to change the configuration from round to rectangular) with the valve gate member and linkage to control the valve gate member. A twelfth step involves opening the access valve and lowering a valve gate member for the EFRD through the access valve and into position to close the EFRD valve when/if required.

The EFRD valve described above is a fully operational gate valve system that can be installed and ready to use without disrupting the flow of the pipeline. The installation is a simple process and saves a tremendous amount of time and money because it does not require an outage (shut down) of the pipeline. The method of installation is similar to a "hot tap" procedure, in the sense that it is welded onto the pipeline in 2-halves and uses a block valve as an access valve and a cutting tower during the procedure. The similarities end there however; as the face plates and cutting system are installed before the valve body is installed.

According to another aspect, there is provided a method of installing an Emergency Flow Restrictor Device (EFRD) on a pipeline, comprising the steps of providing a first face plate having a first sealing face and a second face plate having a second sealing face, each of the first and second face plates having two or more segments that, when assembled, circumscribe the pipeline; assembling the first face plate and the second face plate on the pipeline such that the first sealing face is in face to face, spaced relation to the second face plate and separated by a section of pipeline; assembling a cutting device around the pipeline between the first face plate and the second face plate; providing a valve body having two or more segments that, when assembled, sealingly encloses a length of pipeline and defines an access opening; assembling the valve body on the length of pipeline such that the valve body encloses the first face plate, the second face plate and the cutting device in an interior of the valve body; installing an access valve on the access opening, the access valve providing selective access to the interior of the valve body; securing a cutting tower to the access valve and the cutting device; operating the cutting device to sever the section of pipeline between the first and second sealing faces; retracting the cutting device and severed section of pipeline inside of the cutting tower, closing the access valve and removing the cutting tower from the access valve; connecting a control section to the access valve, the control section having a control linkage that carries a valve gate member of the EFRD; and moving the access valve to the open position and lowering the valve gate member of the EFRD through the access valve into position to selectively close the pipeline against at least one of the first and second face plates.

According to another aspect, the cutting device may be a mechanical cutting ring and the cutting tower comprises a mechanical control linkage, or a water cutting ring; the valve gate member may be mechanically or hydraulically actuated; and the valve gate member may comprise hydraulically actuated sealing faces that expand axially to engage the at least one of the first and second face plates.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 9:
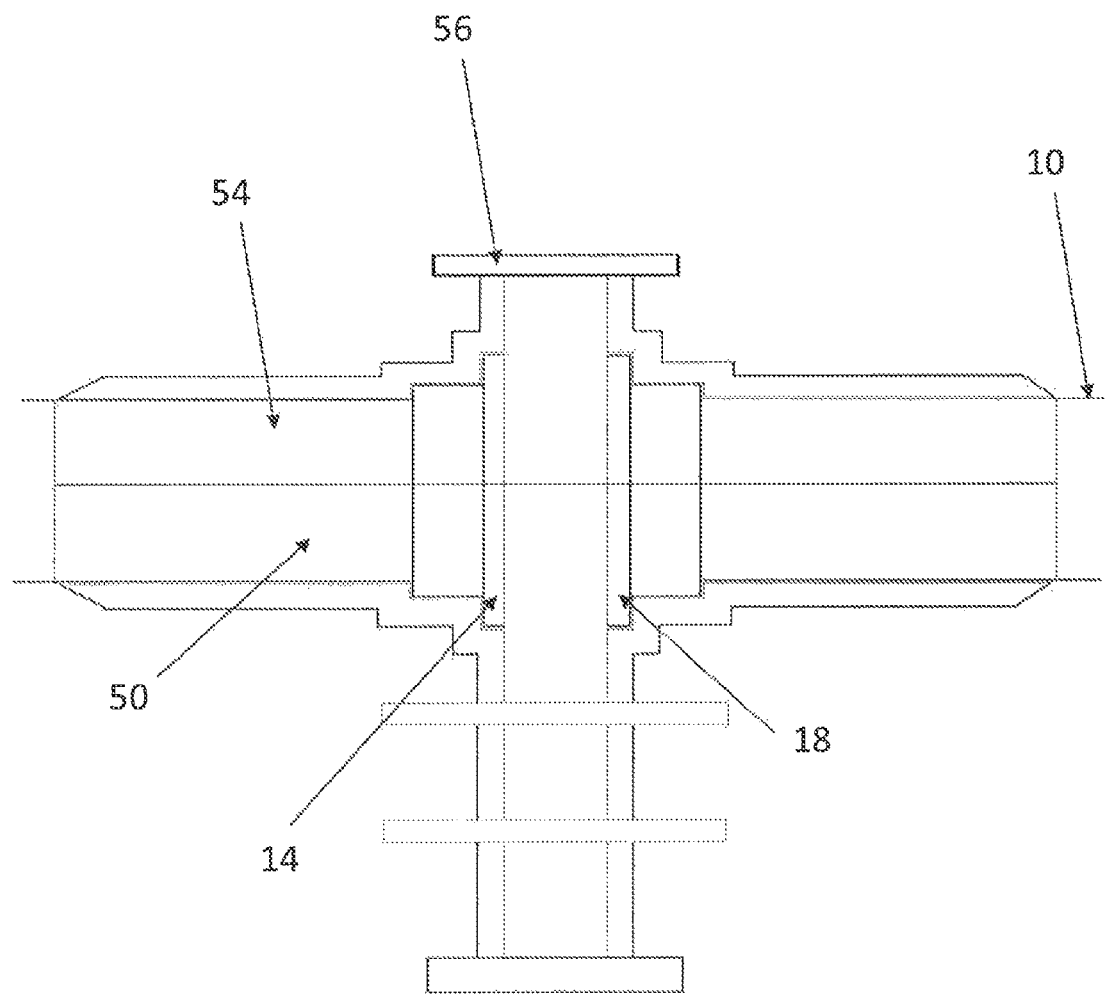
FIG. 9 is a side elevation view of valve body on pipeline.
Figure 17:
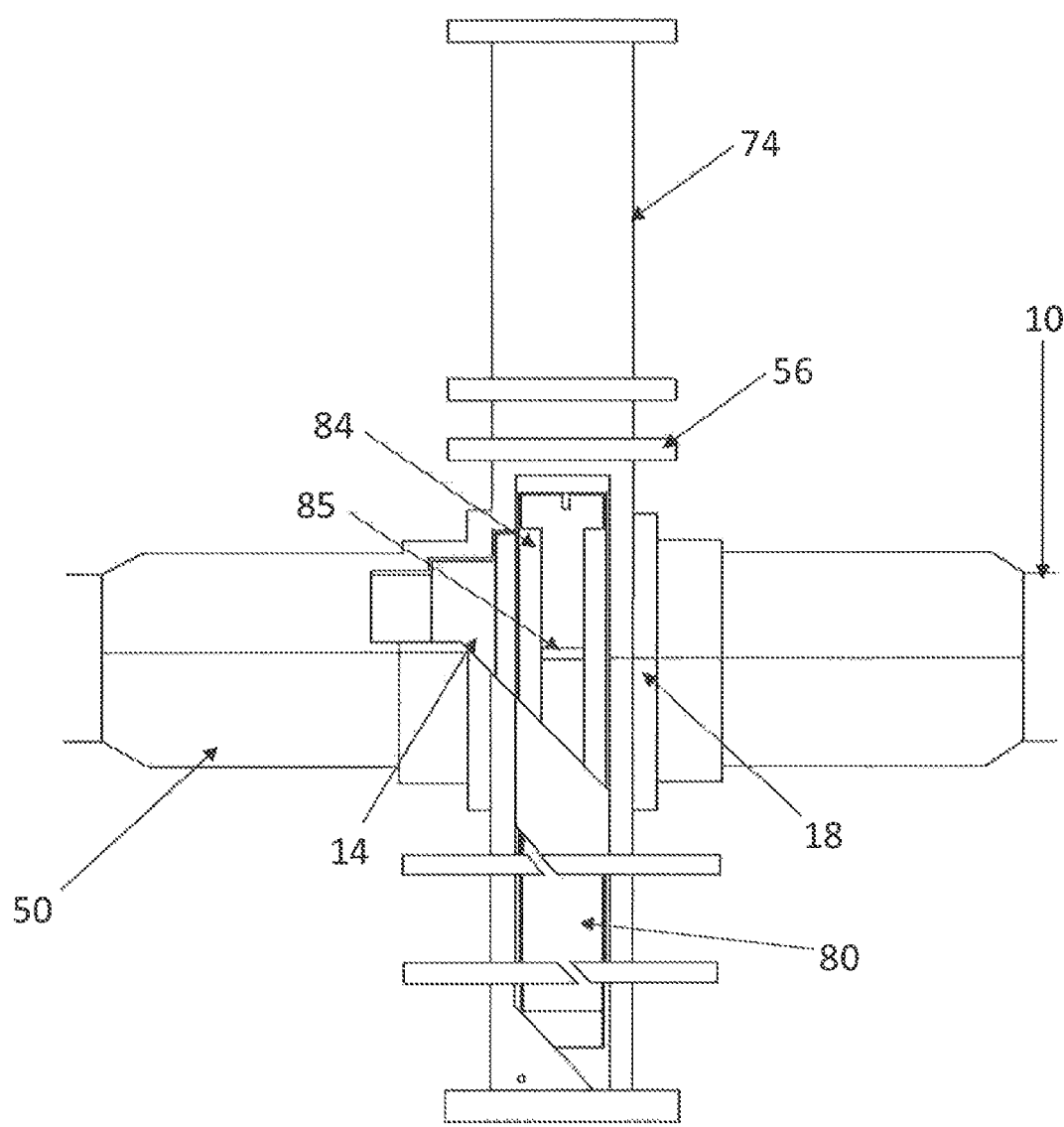
FIG. 17 is a partially cutaway side elevation view of the valve assembly in a sealed position.

Referring to FIG. 9, a general structure and layout of elements is shown that allows an Emergency Flow Restrictor Device (EFRD) to be installed and operated on a pipeline 10. As shown, there is a valve body 50 that encloses face plates 14 and 18, each of which has a sealing and guide face in spaced, face to face relation. The section of pipeline 10 between face plates 14 and 18 will be removed through an access opening at the top of valve body 50. Referring to FIG. 17, face plates 14 and 18 will then be used as the valve seats to engage valve gate 80. Some examples related to methods of installing EFRD, and types of EFRDs will be described in more detail below. It will be understood that the steps taken in installing the EFRD will depend on the design of the EFRD as well as the preferences of the user and the specific circumstances.

Figure 1:
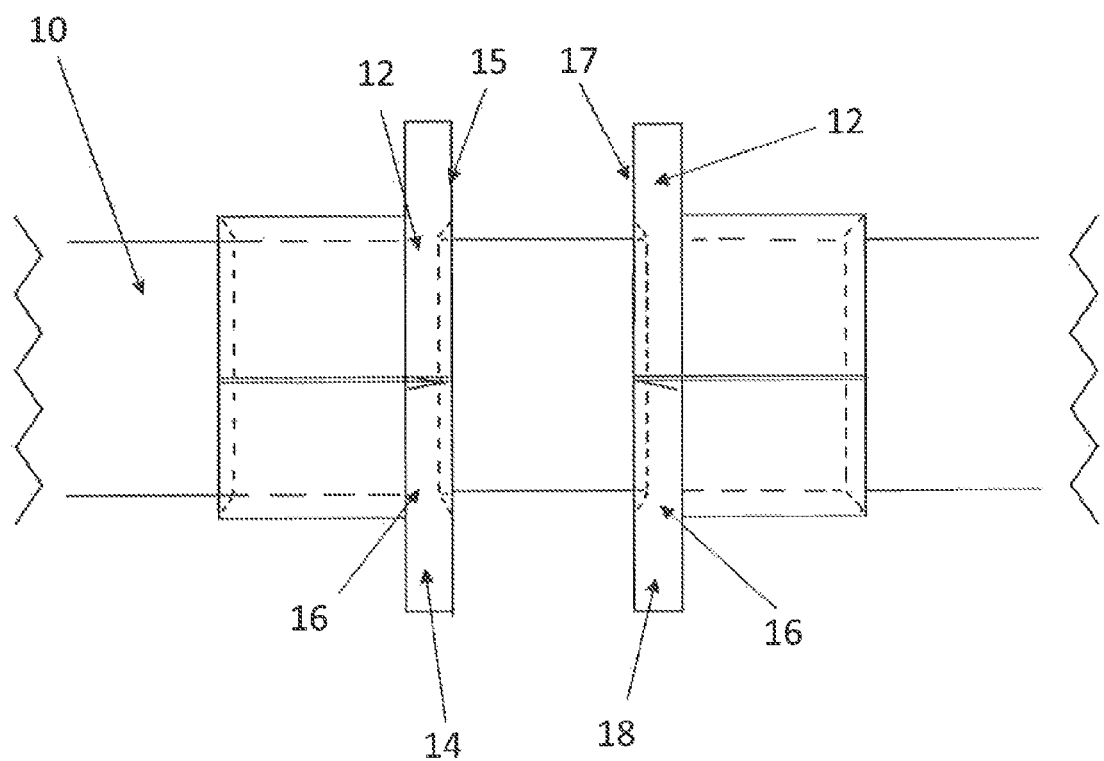
FIG. 1 is a side elevation view of a pipeline with a first face plate and a second face plate mounted in spaced relation.

Referring to FIG. 1, pipeline 10 should be cleaned and prepared along the length of pipeline 10 required for the valve installation. A first segment 12 of a 2-segment first face plate 14 is then placed on pipeline 10 and tack welded into place. A second segment 16 of first face plate 14 is then placed onto pipeline 10 and tack welded to first segment 12, ensuring they are as square and true as possible. Both first segment 12 and second segment 16 are then welded together and at both ends, taking care that any warping or drawing while welding is within predetermined tolerances. First segment 12 and second segment 16 of first face plate 14 are preferably chamfered on the inside edges, and where they connect to each other, to provide room for the welds. While two segments are shown, it will be understood that more segments may also be used.

Referring to FIG. 1, segments 12 and 16 of second face plate 18 are installed using the same procedure described above. Second face plate 18 and first face plate 14 each have sealing faces 15 and 17, respectively, and are installed in parallel spaced relation and spaced by a defined gap. Temporary spacers (not shown) may be used to ensure the gap between first face plate 14 and second face plate 18 is precise. Any weld or slag should then be removed from sealing faces 15 and 17 of face plates 14 and 18, taking care not to scratch or score the surfaces.

A cutting device is then installed between first and second face plates 14 and 18. The cutting device may take different forms, for example, a mechanical cutter and a water jet cutter, as described below.

Figure 2:
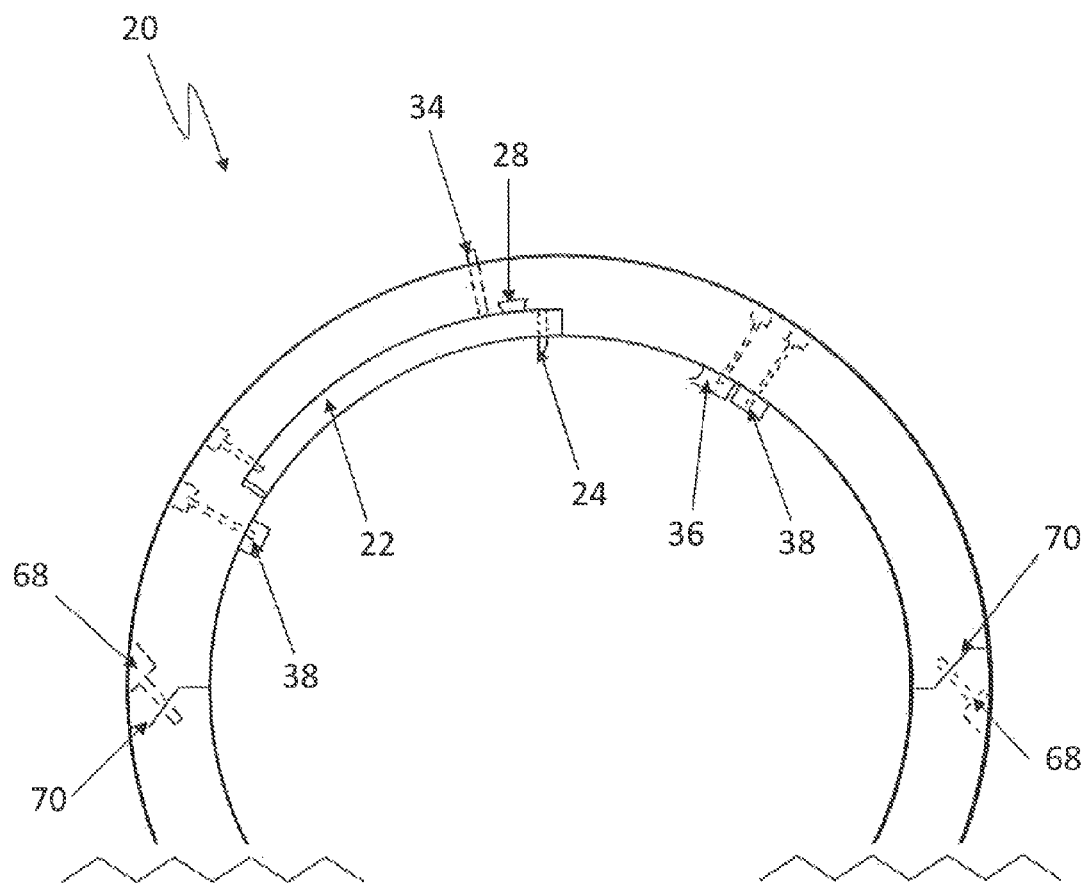
FIG. 2 is a side elevation view of a cutting wheel.
Figure 3:
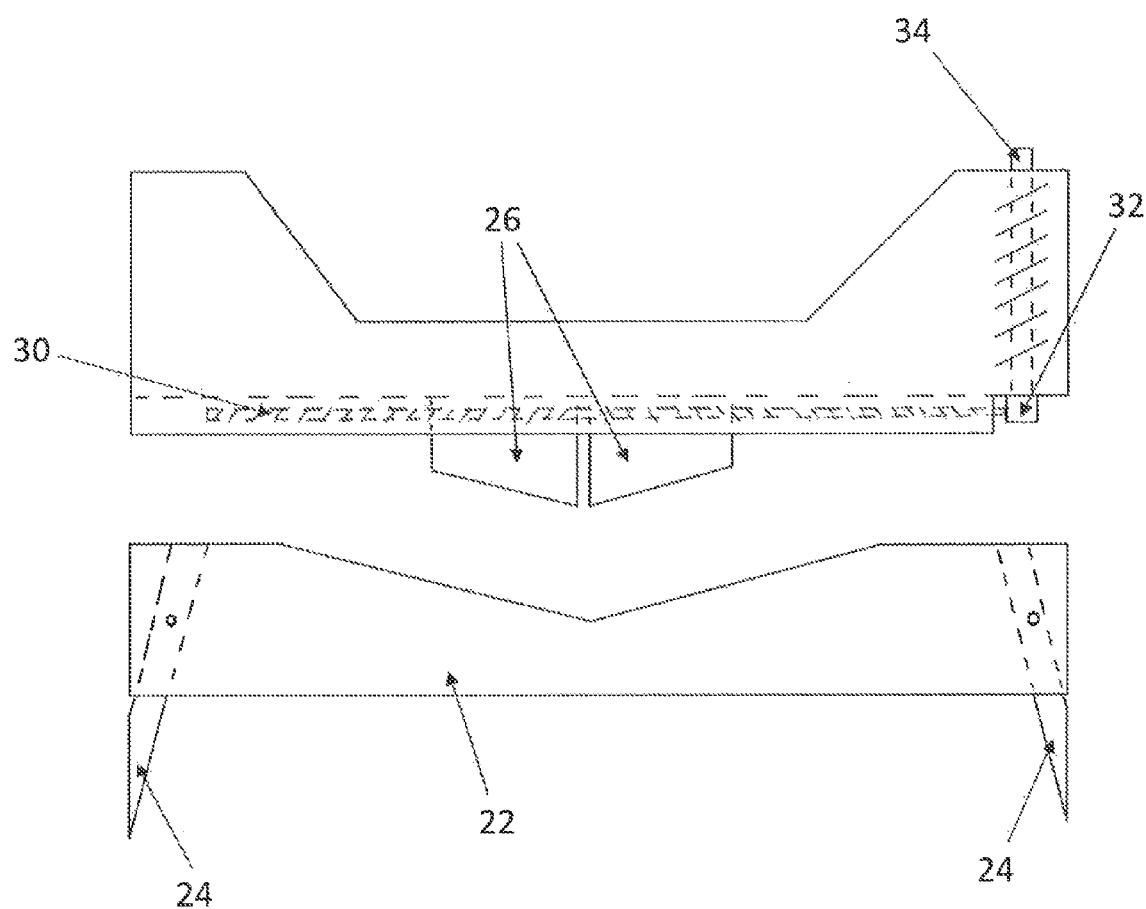
FIG. 3 is a section view of the cutting wheel of FIG. 2, with gear detail.

Referring to FIG. 2, an example of a mechanical cutter device is shown. It will be understood that variations of the design below may be used and that the described and depicted embodiment only represents one example of a mechanical cutter device. The depicted cutter device is installed by setting a 2-piece cutting wheel 20 into place and bolting it together using connecting bolts 68 in connecting points 70. Each half of cutting wheel 20 has a cutting bar 22 mounted on the inside. Referring to FIG. 3, each cutting bar 22 has two cutting bits 24 (one on each side). Each cutting bar 22 is activated by 2-wedges 26 that slide in tapered slots 28 on the inside of cutting wheel 20. A worm-screw 30 (with a left hand thread on one end and a right hand thread on the other) is threaded through these wedges 26. A spring loaded ratchet 32 is fastened to one end of worm-screw 30. A spring-loaded plunger 34 runs through the edge of cutting wheel 20, which contacts a striker plate 35 (shown in FIG. 5) when cutting wheel 20 rotates, pushing ratchet 32 down each time plunger 34 is depressed. This turns the worm-screw 30 which moves wedges 26 apart, moving cutting bits 24 down at the precise rate required (like a machine lathe) to sever the section of pipeline 10. In order to prevent damage to the worm screw 30, spring loaded latches may be provided (not shown). When the wedges 26 reach a "full-cut" position, the latches are triggered, which act to contain the ratchet 32 in the down position and prevent further movement of the worm screw 30 should the cutting wheel 20 be operated longer than is required to complete the cutting of the pipeline 10.

Figure 4:
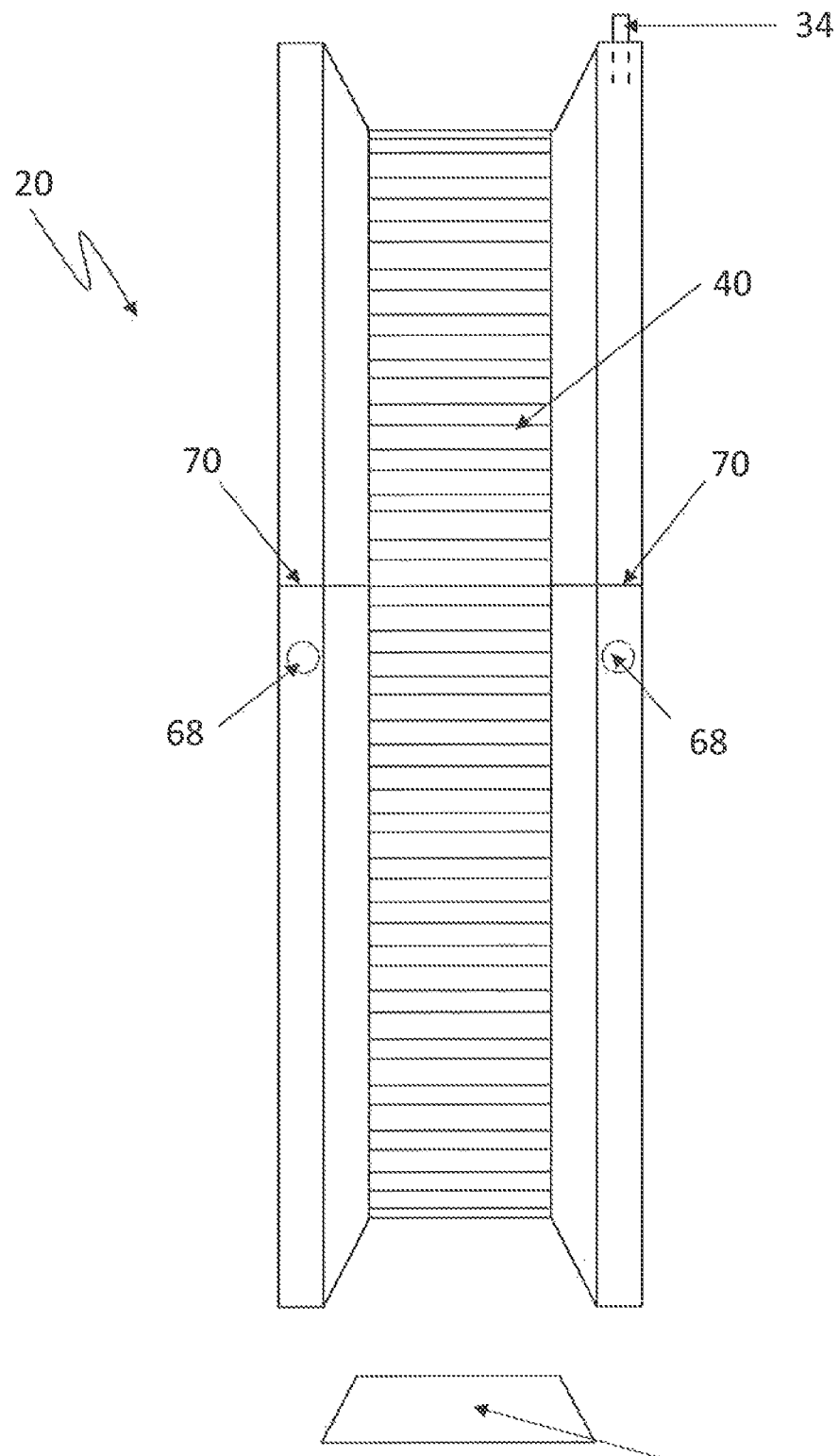
FIG. 4 is an end elevation view of the cutting wheel of FIG. 2.
Figure 5:
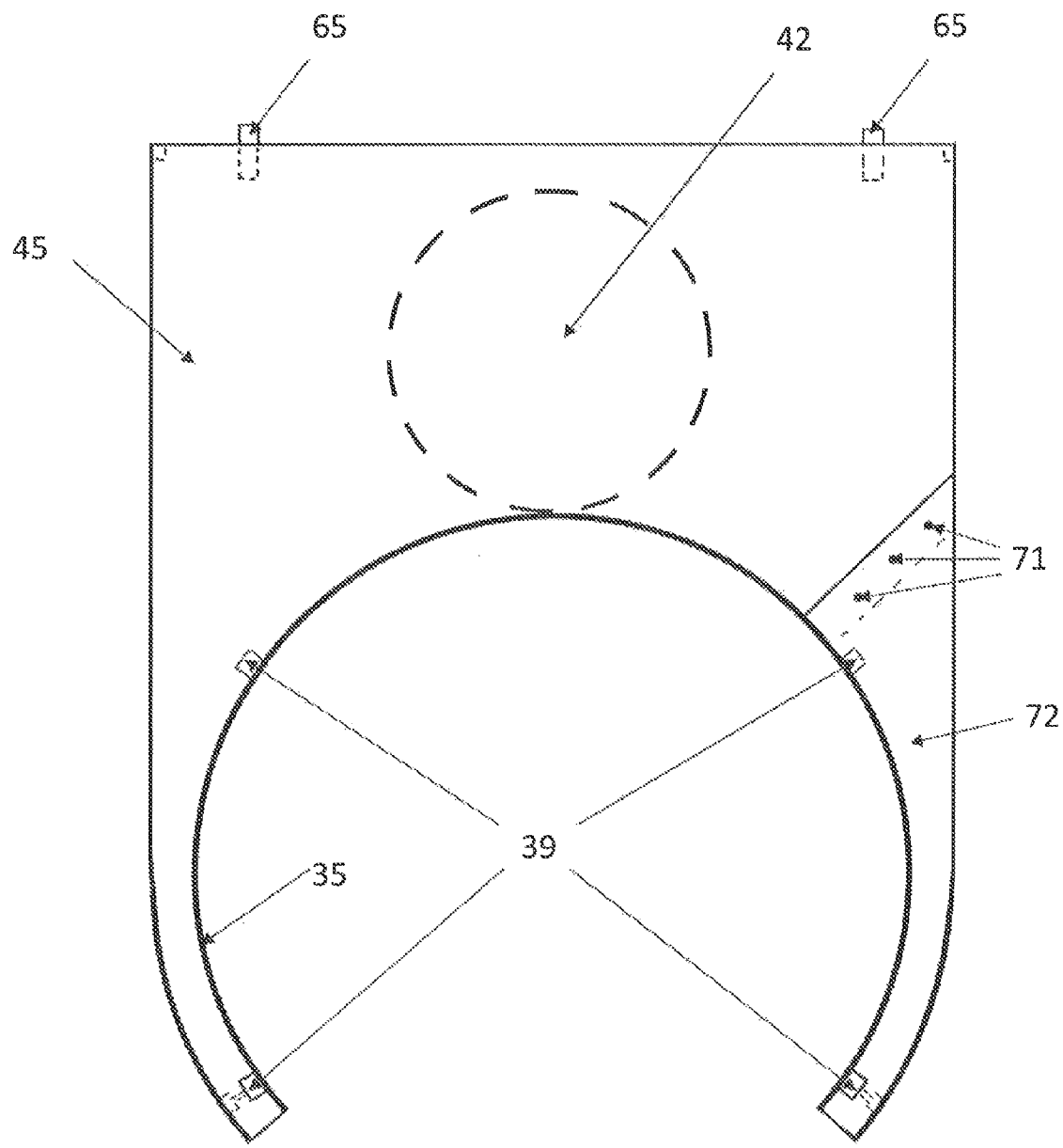
FIG. 5 is a side elevation view of cutting assembly for cutting wheel of FIG. 2.

Referring to FIG. 2, a rubber and magnetic catcher 36 sits behind each set of cutting bits 24 (to contain the metal cuttings inside the cutting wheel). Referring to FIG. 5, four alignment guides 38 made from, for example Teflon™, are mounted on the inside of cutting wheel 20, to ensure it runs true with pipeline 10 while turning. Referring to FIG. 4 and FIG. 5, the outside of cutting wheel 20 (centre section) is a driven gear 40, which engages a drive gear 42, which rotates the wheel 20 during the cut procedure. Referring to FIG. 4, on either side of this driven gear 40 cutting wheel 20 is sloped so a second set of Teflon™ guides 39 in the drive assembly hold it straight and true and in contact with drive gear 42. The outer edges of cutting wheel 20 provide room for connecting bolts 68 that are received in connecting points 70 and plungers 34 that operate the cutting bars 22 (as the drive assembly is only the width of the Teflon™ guides 39). Providing two sets of Teflon™ guides 38 and 39 serves to provide control over the cutting wheel 20. The first set of alignment guides 38 are provided such that they are aligned with the outside of the cutting wheel 20, ensuring the cutting wheel 20 remains aligned and securely in contact with the driving gear 42 during the cutting process. The second set of alignment guides 39 fit within the inside of the cutting wheel 20, ensuring that the cutting wheel 20 runs true and minimizing chatter and vibration during the cutting process.

Referring to FIG. 5, a section 72 from the first portion of the drive assembly 45 is removed using connecting bolts 71, and the assembly 45 is slipped into place over top of the cutting wheel 20. Section 72 of drive assembly is reinstalled, and Teflon™ guides 39 are adjusted.

Figure 6:
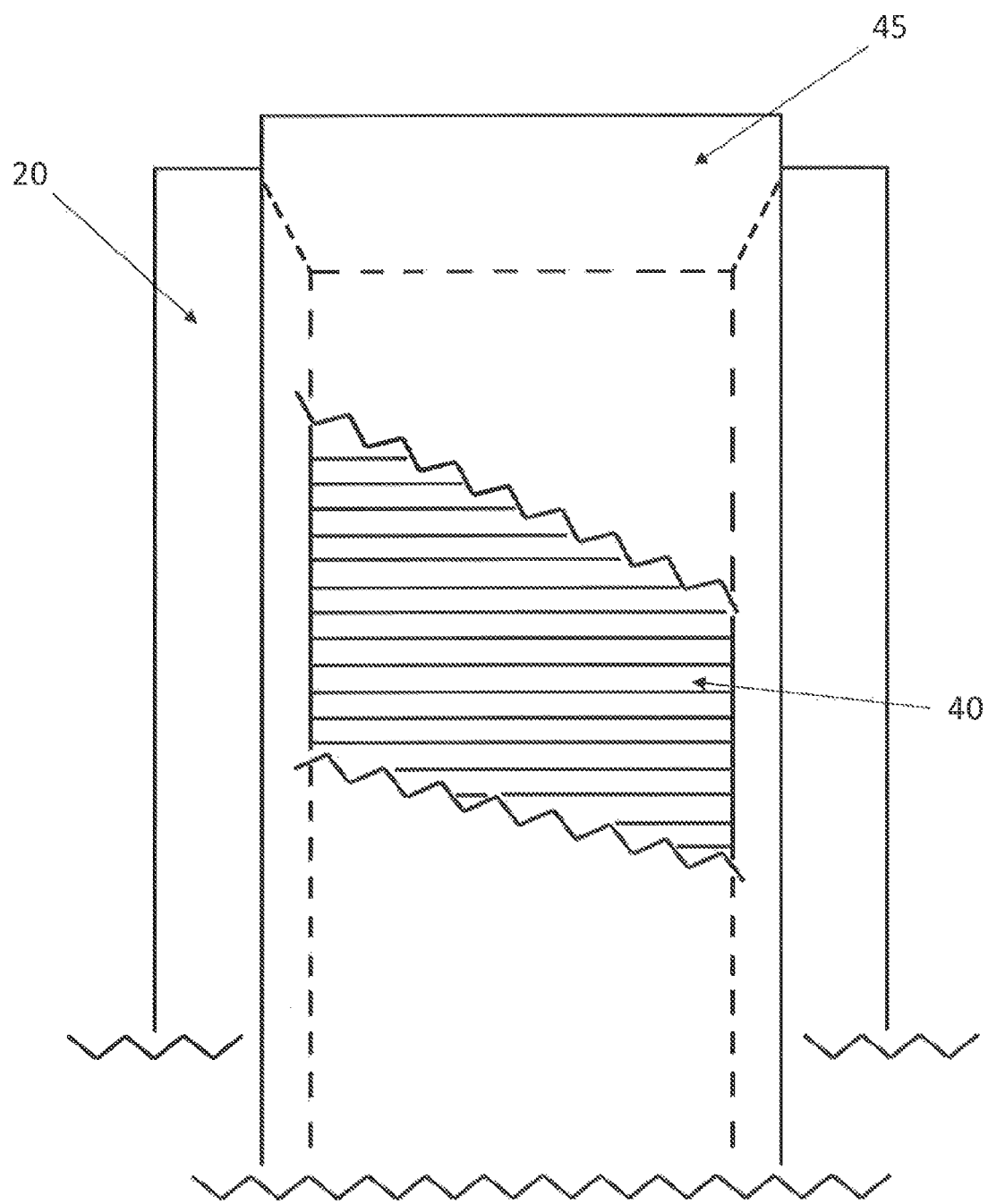
FIG. 6 is an end elevation view of cutting assembly of FIG. 5.

Referring to FIG. 6, the exterior of first portion of the drive assembly 45 is shown engaging cutting wheel 20. The outside edges of cutting wheel 20 are spaced such that the drive assembly 45 fits within the edges. The cut away in FIG. 6 shows the driven gear 40 that engages with drive assembly 45.

Figure 7:
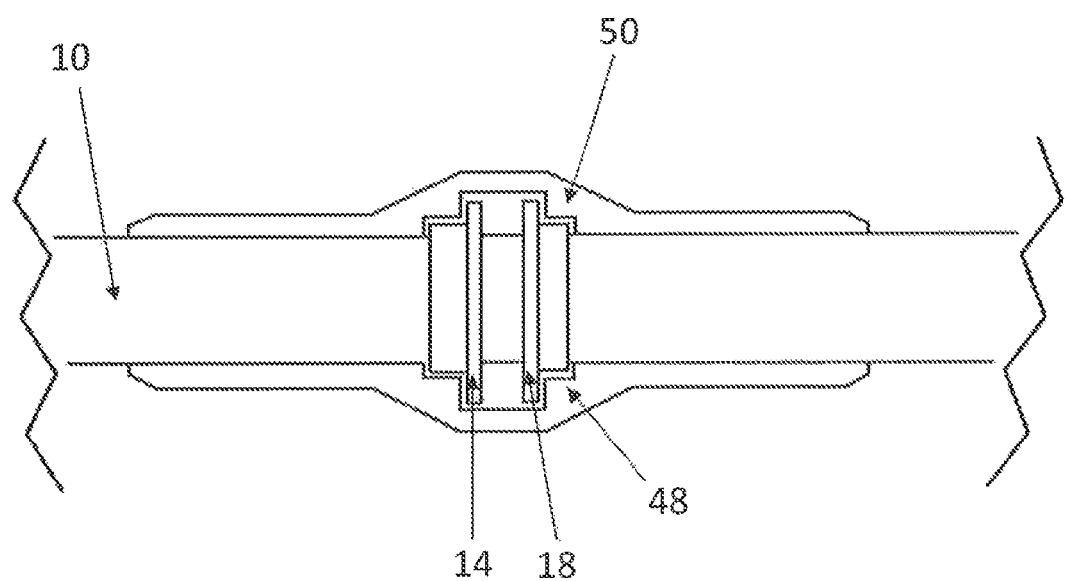
FIG. 7 is a top plan view of bottom segment of valve body on pipeline.
Figure 8A:
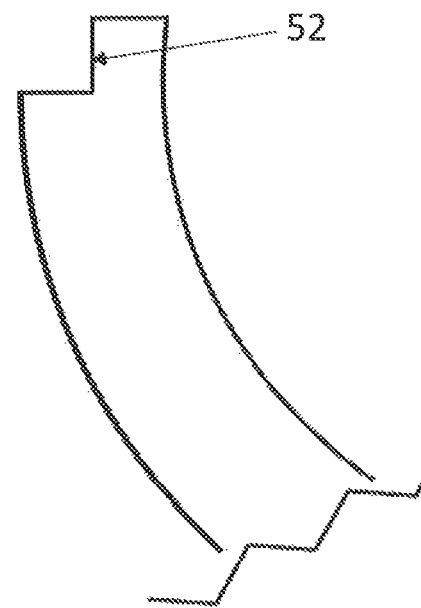
FIG. 8a is an end elevation view, in section, of the valve body of FIG. 7.
Figure 8B:
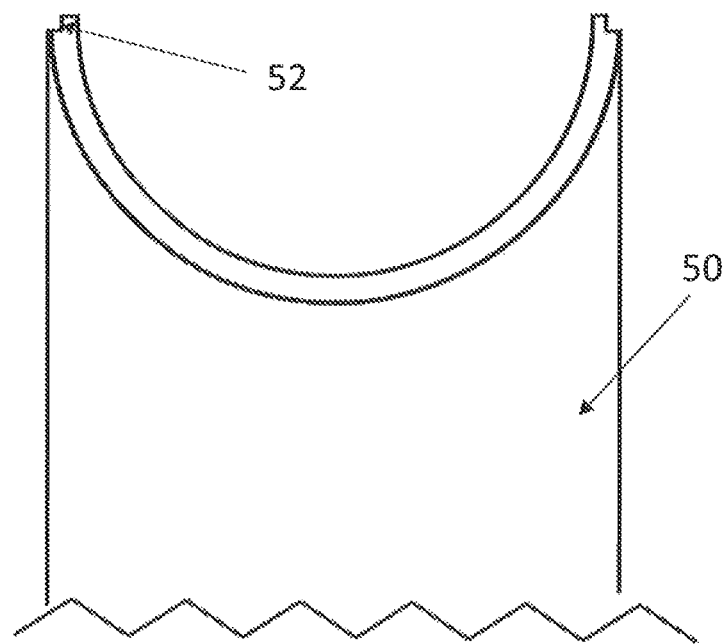
FIG. 8b is a detailed end elevation view, in section, of the valve body of FIG. 7.
Figure 8C:
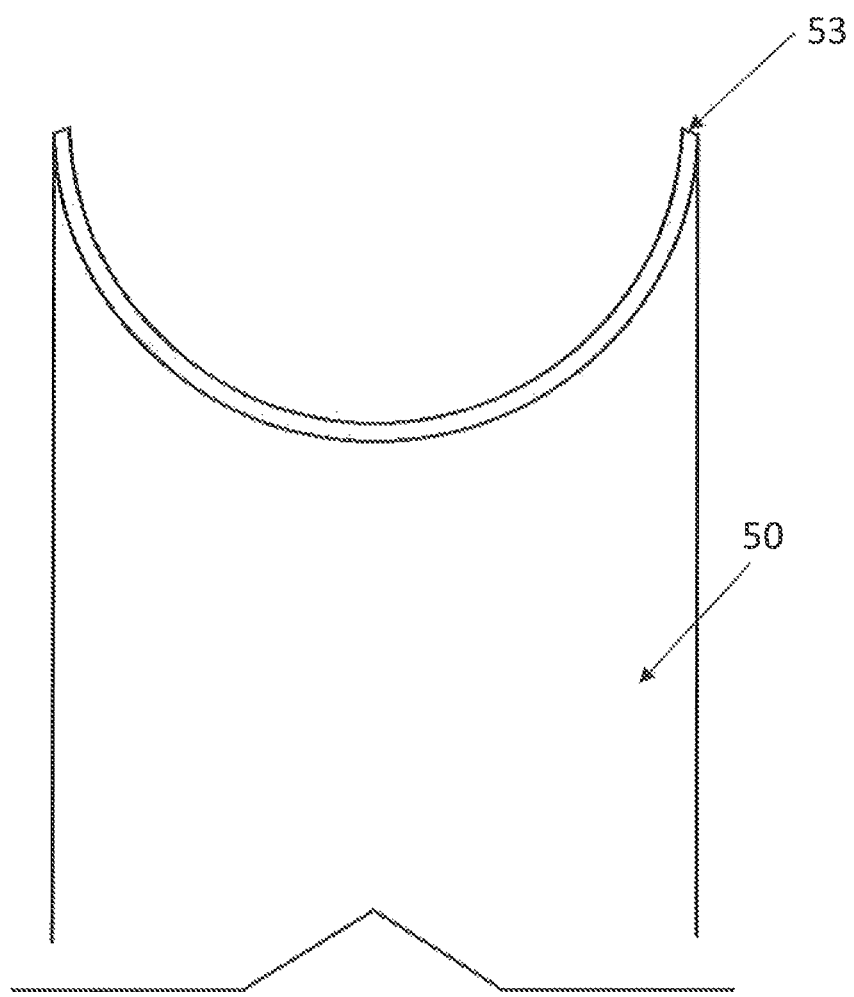
FIG. 8c is a detailed end elevation view, in section, of an alternate valve body.

Referring to FIG. 7, lower half 48 of valve body 50 is lifted into place, and tack welded, ensuring it is level. Referring to FIG. 8*a* and FIG. 8*b*, the centre section of valve body 50 may have a lip 52 for the top half of valve body 50 to slip down over, to ensure the two halves can be welded together without any weld entering the working portion of the valve. Alternatively, and in particular in jurisdictions where lips 52 may not be permitted by regulations, a version as shown in FIG. 8*c* may be used, where the centre section of valve body 50 has a bevelled lip 53 to ensure the two halves can be welded together, and to the pipeline.

Figure 10:
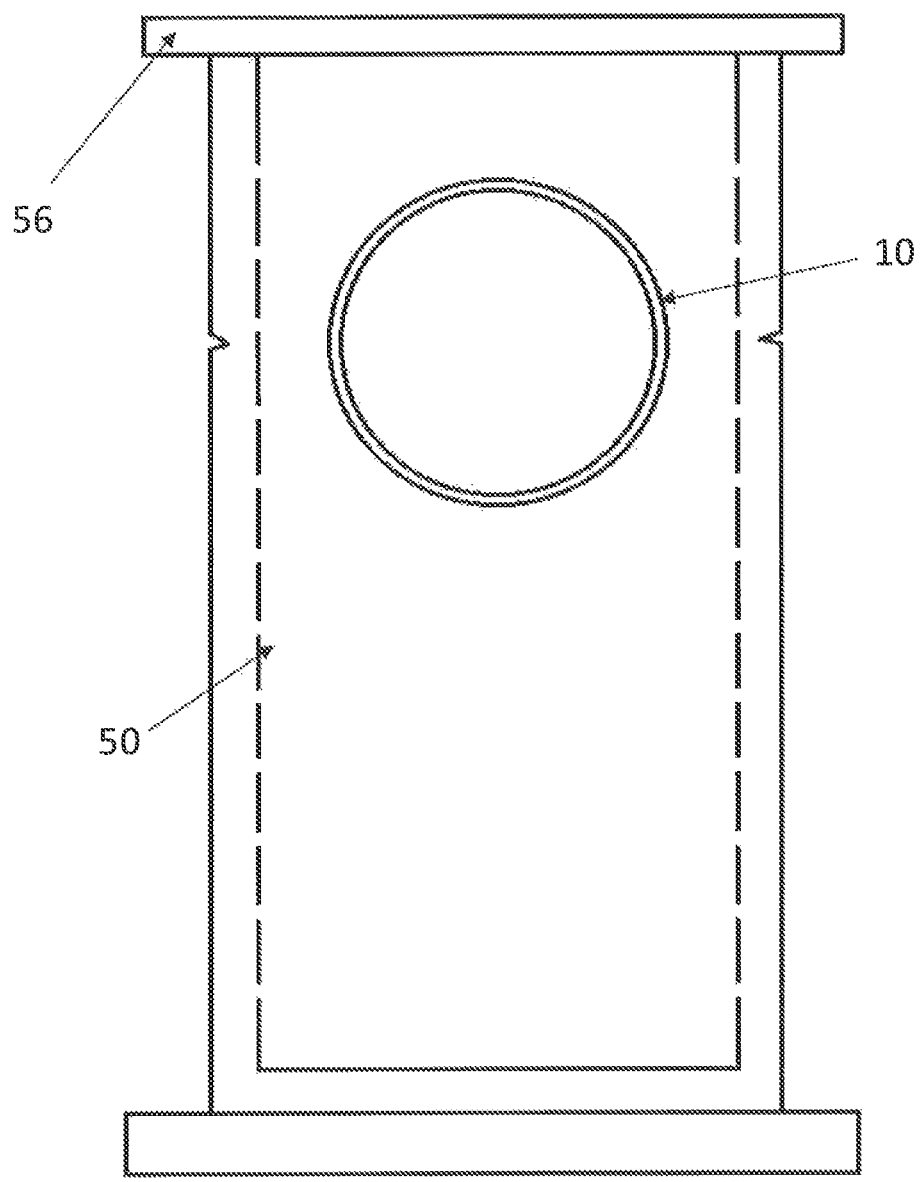
FIG. 10 is an end view, in section, of valve body on pipeline.
Figure 11:
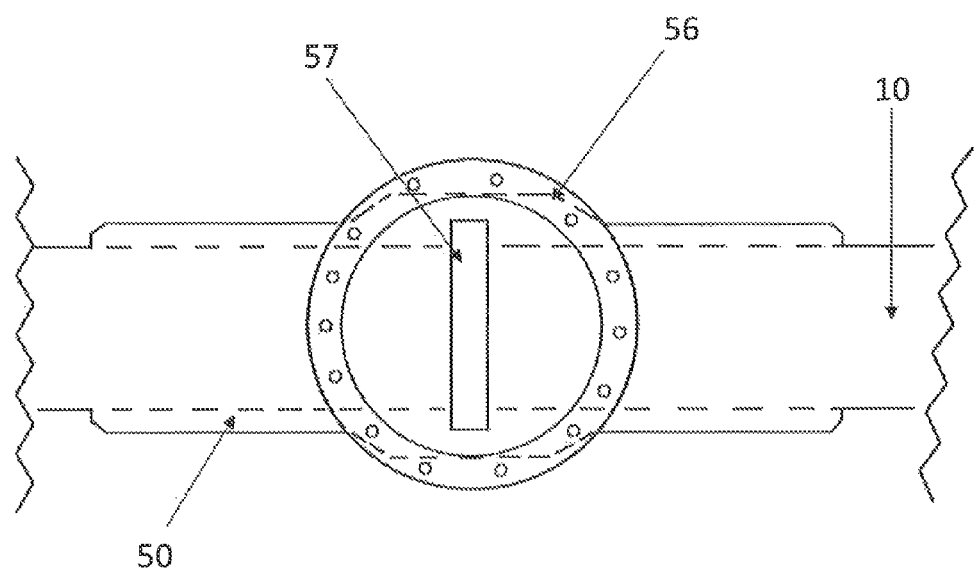
FIG. 11 is a top plan view of valve body on pipeline.

Referring to FIG. 9, top half 54 of valve body 50 is then set into place and both halves are welded together, and onto pipeline 10. The cutting assembly may be sticking up through the slot in the top, but just below the level of the flange. During welding, welding blankets may be placed inside the rectangular sections to ensure the two halves can be welded together without any weld entering the interior of valve body 50. Referring to FIG. 10 and FIG. 11, valve body 50 has a flange 56 defining an access opening 57. Because a gate valve member for an EFRD valve is wider than pipeline 10, flange 56 is preferably constructed to fit a larger size pipe. For example, a 24" pipeline may require a 30" flange.

It is preferred that a blind flange (not shown) be installed and EFRD valve body 50 is pressure tested. The blind flange may be made as known in the art. For example, the blind flange may be a flat plate that is bolted onto flange 56 such that valve body 50 can be pressure tested. When the test is completed, the blind flange is removed.

Figure 12:
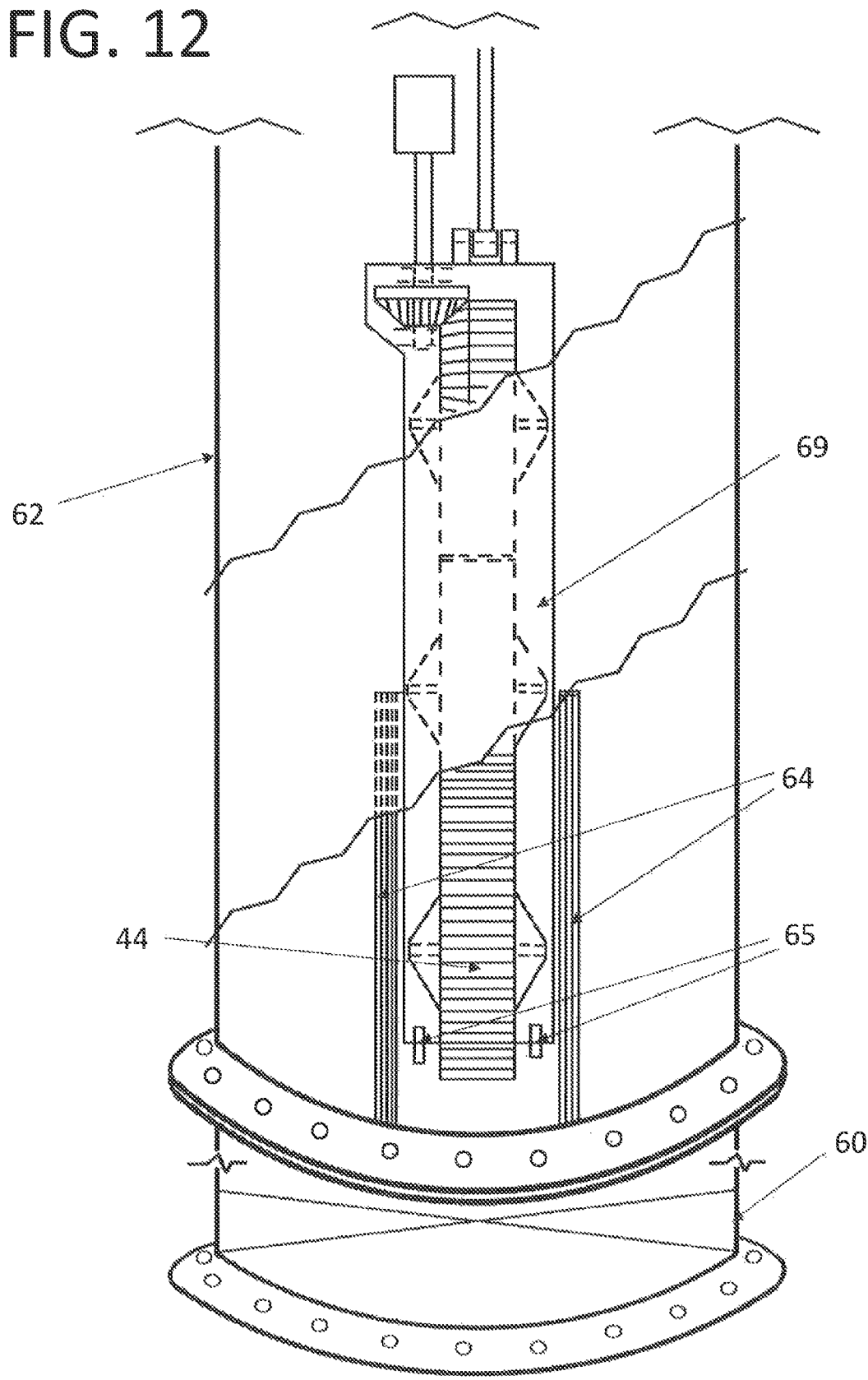
FIG. 12 is an end elevation view, in section, of a drive assembly for the cutting wheel of FIG. 2.

Referring to FIG. 12, an access valve 60, or block valve, may then be installed on top flange 56. Access valve 60 is preferably in the open position. Access valve 60 may be any valve known in the art that allows for the valve body 50 to be sealed and through which the cutting device and control section may be manipulated.

Referring to FIG. 12, a second half of cutting assembly 69 is lowered into position (protruding the required amount to reach through access valve 60 and snap into place in the bottom section of the drive assembly). Second half of cutting assembly 69 attaches to the first half of cutting assembly 45 shown in FIG. 5. Guides 64 are provided to ensure the two sections line up and "spring-loaded" latches 65 snap into place to connect them. This also engages the drive gear 44 in the top assembly with the driven gear 42 in the bottom assembly.

Referring to FIG. 12, cutting tower 62 may then be lowered and bolted onto the flange 56 of the block valve 60. With cutting tower 62 sealed above cutting assembly 69, cutting tower 62 may be filled with product from the pipeline and any trapped air bled off. While not shown, cutting tower 62 is sealed in a manner that is similar to what is used in hot tapping tools, where the control elements that permit operation of cutting assembly 69 extend out from cutting tower 62, and also allow the cutting device to be retracted above access valve 60.

Referring to FIG. 2 through FIG. 5, cutting wheel 20 may then be engaged to sever the section of pipeline between face plates 14 and 18.

Figure 14:
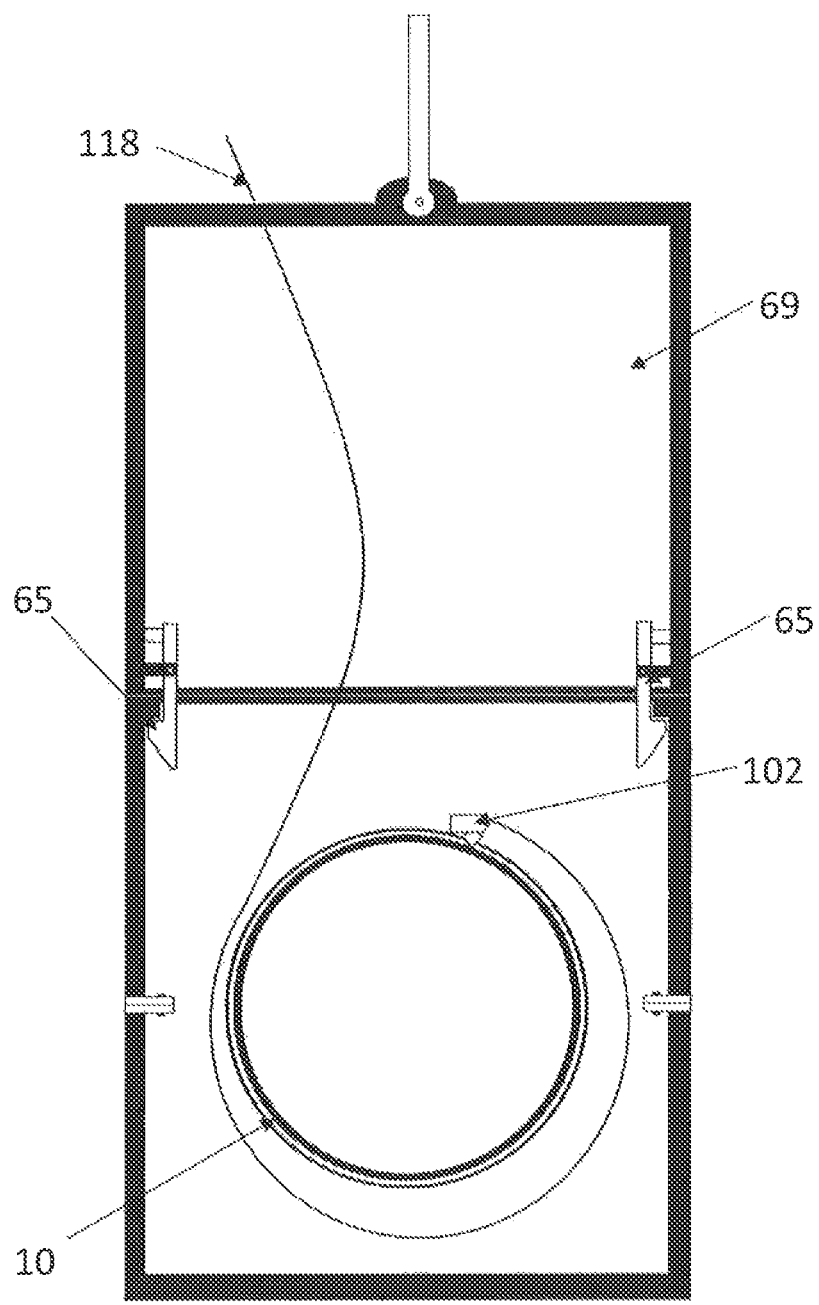
FIG. 14 is an end elevation view, in section, of a water cutting assembly installed on the pipeline.
Figure 15:
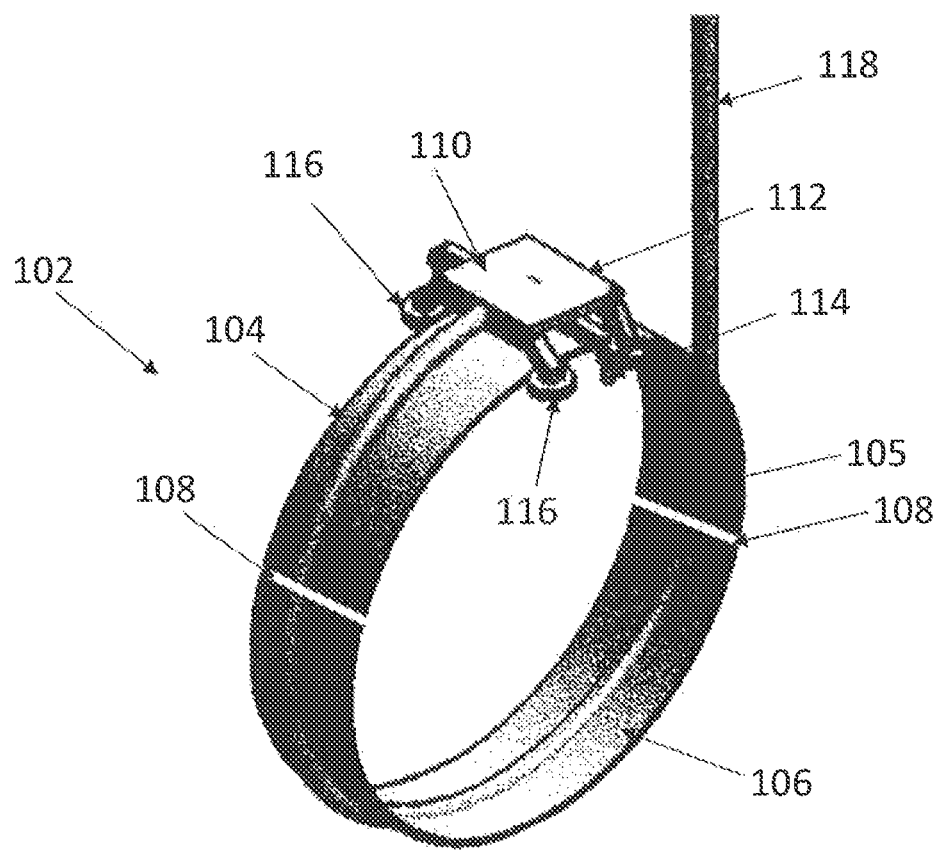
FIG. 15 is a perspective view of the water cutting assembly.

An alternate cutting assembly is shown in FIG. 14 installed on pipeline 10 within cutting assembly 69. Referring to FIG. 15, cutting assembly is a water cutter 102, such as a water cutter that operates using high pressure water in combination with an abrasive, such as sand. Commercially available water jet cutters may be used, such as one manufactured by Jet Edge Waterjet Systems of Boston, Mass., and suitably adapted to be used in the particular circumstances described herein. As shown, water cutting assembly 102 includes a guiding track 104 made up of two parts 105 and 106 connected at connecting joints 108. There is a cutter head 110 with a drive motor 112, cutting nozzles 114 and rollers 116. Cutter head 110 receives the necessary fluids via one or more hoses 118 and during operation, moves along guiding track 104 as it cuts through pipeline 10. Hoses 118 will be attached to nozzles on the inside of cutting tower 62 during installation of cutting tower 62 (not shown), which is then connected to the necessary fluid sources.

Referring to FIG. 12, the drive assembly 45 and 69 is retracted into the cutting tower 62, pulling the cutting wheel 20 and severed section of pipeline 10 inside with it. Block valve 60 may then be closed and cutting tower 62 is drained and removed.

Figure 13:
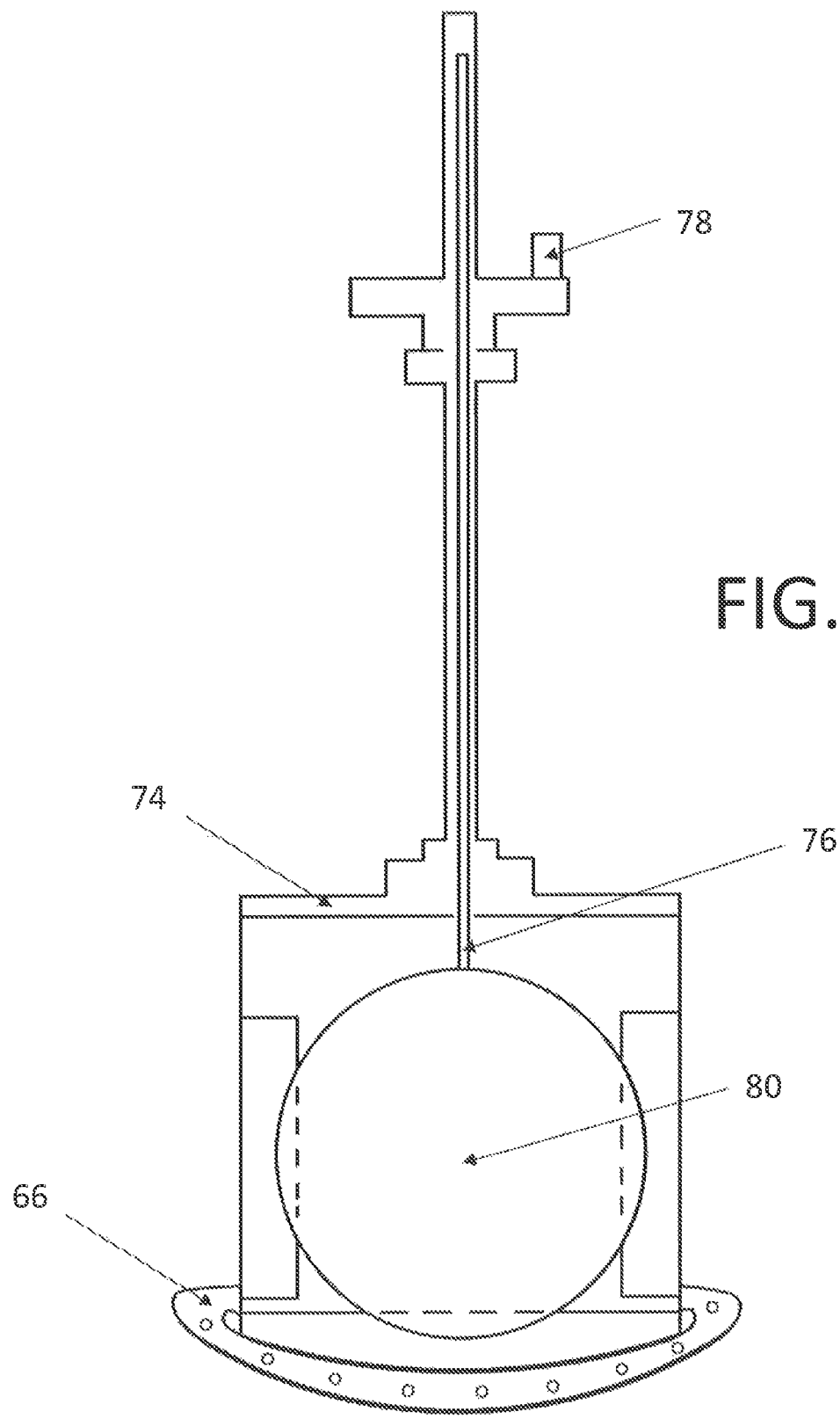
FIG. 13 is an end elevation view, in section, of valve controller with gate valve member.

Referring to FIG. 13, once cutting tower 62 has been removed, control section 74 of the EFRD valve may then be installed on access valve 60. Preferably, control section 74 has a converter plate in the form of a bottom flange 66 such that the configuration of the opening is changed from round to rectangular to accommodate the control section 74. As with cutting tower 62, control section 74 is sealed above access valve 60 with the necessary control elements being controlled from outside control section 74 to operate the EFRD. Once mounted, control section 74 is filled with pipeline product and any trapped air bled off. Access valve 60 can then be opened and the EFRD gate assembly 76 lowered through the access valve 60 and into the ready position to complete the installation. As access valve 60 will remain part of the installed EFRD assembly, regulations and safety concerns may not permit it to have a protruding valve stem.

Figure 16:
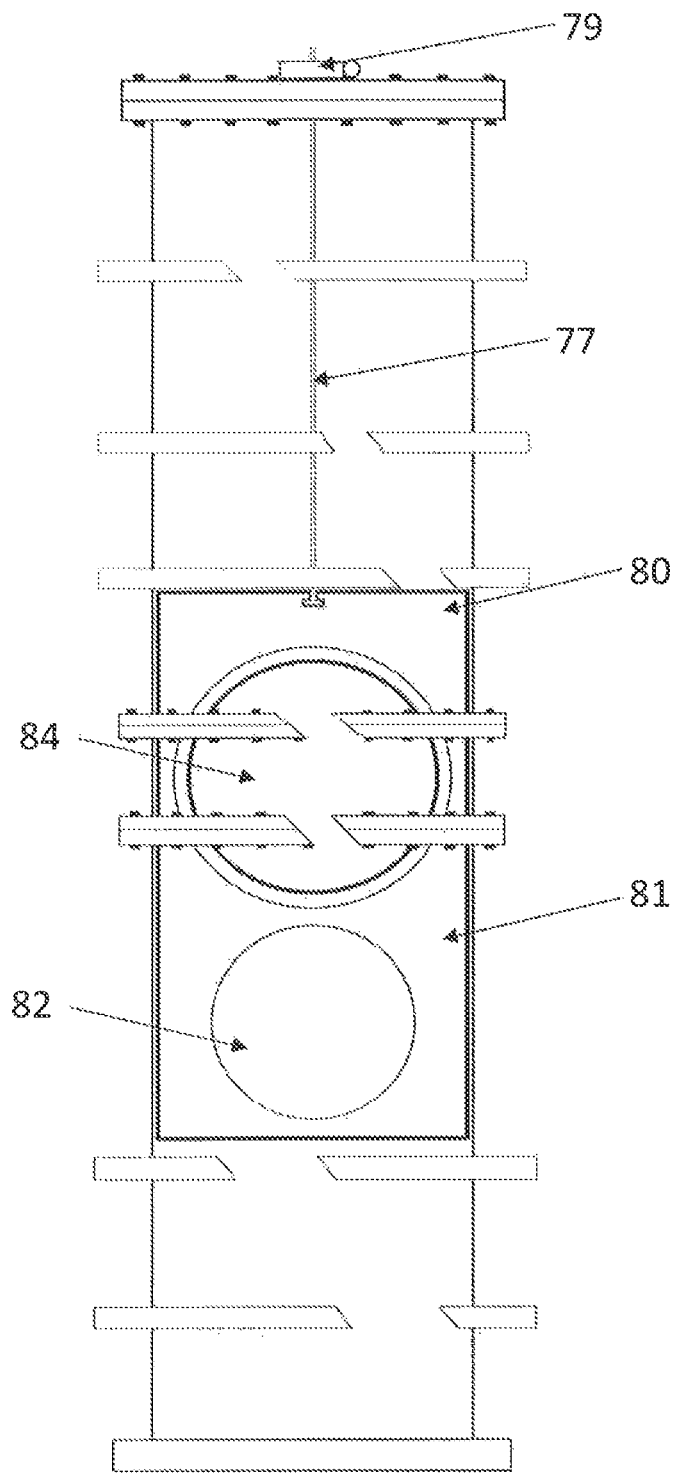
FIG. 16 is an end elevation view, in section, of an alternate valve controller with gate assembly installed on the pipeline.
Figure 18:
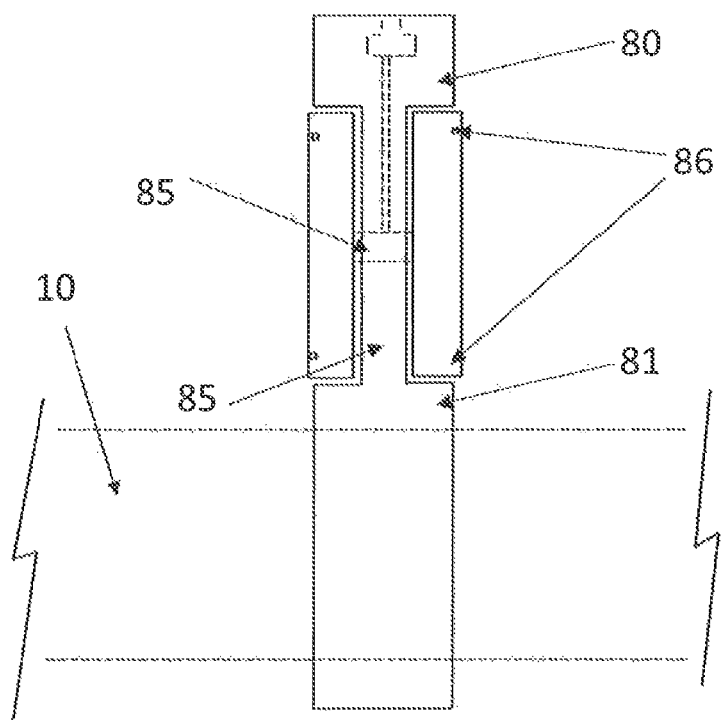
FIG. 18 is a side elevation view in section of an alternate EFRD valve gate.
Figure 19:
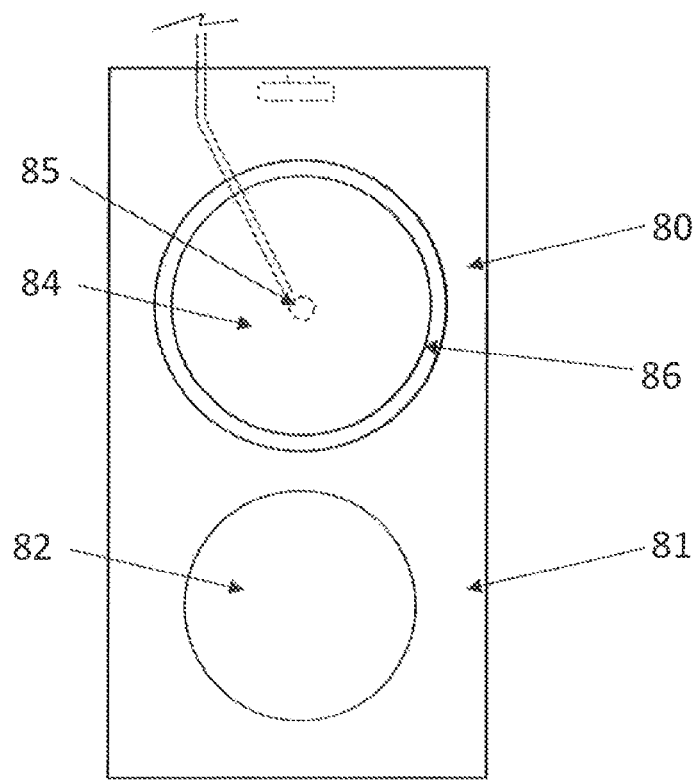
FIG. 19 is an end elevation view of the alternate EFRD valve gate of FIG. 18.
Figure 20:
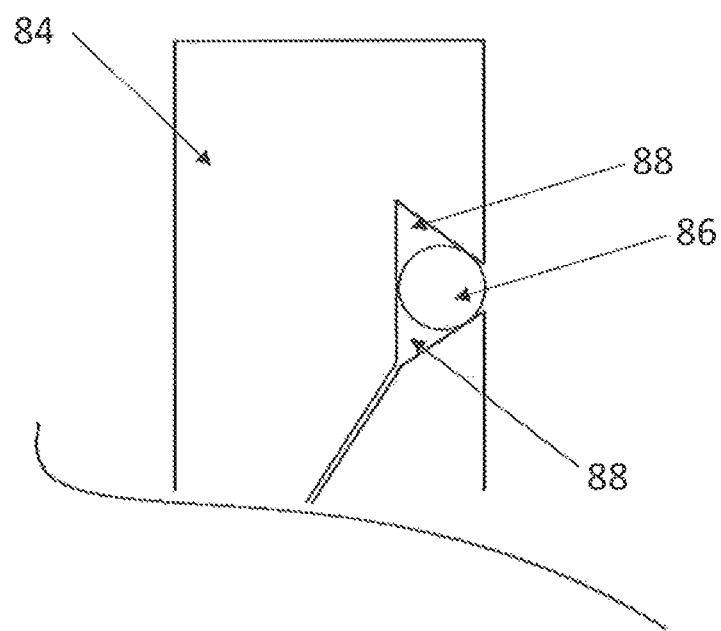
FIG. 20 is a detailed side elevation view in section of a seal of the EFRD valve gate of FIG. 18.

In an alternate embodiment, referring to FIG. 17-19, gate valve 80 may be a double high plate 81, with an opening 82 in a lower half, and a sealing section 84 in an upper half. Gate valve 80 is controlled by a valve stem 77 that extends out from control section 74 and is engaged by an electric motor 79 that uses a worm gear to control the position of valve stem 77. Other designs to control valve stem 77 or move gate valve 80 will be recognized by those skilled in the art. In the open position, opening 82 is aligned with pipeline 10 as shown in FIG. 16. In the closed position, referring to FIG. 17, gate valve 80 is lowered until sealing section 84 engages face plates 14 and 18, and opening 82 is below pipeline 10. Referring to FIGS. 18 and 19, to obtain a better seal, sealing section 84 may be hydraulically or otherwise actuated laterally, or toward face plates 14 and/or 18 when in the sealing position. As shown, sealing section 84 is actuated by energizing a hydraulic cylinder 85. In addition or in the alternative, referring to FIG. 20, sealing section 84 may have O-rings 86, and the channel 88 in which O-rings 86 are seated may also be energized by hydraulic fluid to push O-rings 86 outward to enhance the seal between gate valve 80 and face plates 14 and/or 18.

Referring to FIG. 13, when an event occurs such that a user wants to close the EFRD valve, it may be activated using, for example, a controller, or a manual activation of the EFRD gate assembly 76. A motor 78 lowers the gate valve 80 the rest of the way through the access valve 60 from the ready position to a blocking position in the pipeline. Gate valve 80 is seated between face plates 14 and 18 with the cut edge of the pipeline 10 flush with the surface of the face plates 14 and 18. This forms a seal in the pipeline 10 and the flow of fluid through the pipeline is stopped.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The illustrated embodiments have been set forth only as examples and should not be taken as limiting a purposive interpretation of the claims.

What is claimed is:

1. A method of installing an Emergency Flow Restrictor Device (EFRD) on a pipeline, comprising:
   providing a first face plate having a first sealing face and a second face plate having a second sealing face, each of the first and second face plates having two or more segments that, when assembled, circumscribe the pipeline;
   assembling the first face plate and the second face plate on the pipeline such that the first sealing face is in face to face, spaced relation to the second face plate and separated by a section of pipeline, and the first face plate and the second face plate being welded to the pipeline;
   assembling a cutting device such that the cutting device radially circumscribes the pipeline between the first face plate and the second face plate,
   providing a valve body having two or more segments that, when assembled, sealingly encloses a length of pipeline and defines an access opening;
   assembling the valve body on the length of pipeline such that the valve body encloses the first face plate, the second face plate and the cutting device in an interior of the valve body;
   installing an access valve on the access opening, the access valve providing selective access to the interior of the valve body;
   securing a cutting tower to the access valve and the cutting device;
   operating the cutting device to sever the section of pipeline between the first and second sealing faces to form a first cut edge of the pipeline that is flush with the first sealing face of the first face plate and a second cut edge of the pipeline that is flush with the second sealing face of the second face plate;
   retracting the cutting device and severed section of pipeline inside of the cutting tower;
   closing the access valve and removing the cutting tower from the access valve;
   connecting a control section to the access valve, the control section having a control linkage that carries a valve gate member of the EFRD; and
   moving the access valve to the open position and lowering the valve gate member of the EFRD through the access valve into position to selectively close the pipeline against at least one of the first and second face plates.

2. The method of claim 1, wherein the cutting device is a mechanical cutting ring and the cutting tower comprises a mechanical control linkage.

3. The method of claim 1, wherein the cutting device is a water cutting ring.

4. The method of claim 1, wherein the valve gate member is mechanically or hydraulically actuated.

5. The method of claim 1, wherein the valve gate member comprising hydraulically actuated sealing faces that expand axially to engage the at least one of the first and second face plates.

6. A method of installing an Emergency Flow Restrictor Device (EFRD) on a pipeline, comprising:
   providing a first face plate having two or more segments that, when assembled, circumscribe the pipeline and providing a second face plate having two or more segments that, when assembled, circumscribe the pipeline;
   assembling and welding the first face plate in place encircling the pipeline and the second face plate encircling the pipeline, in face to face relation to the first face plate, and the first face plate and the second face plate being welded to the pipeline;
   assembling a circular cutting wheel such that the circular cutting wheel radially circumscribes the pipeline between the first face plate and the second face plate;
   providing a valve body having two or more segments that, when assembled, enclose the pipeline, the first face plate, the second face plate and the cutting wheel, the valve body having an access opening;
   assembling and welding the valve body in place enclosing the pipeline, the first face plate, the second face plate and the cutting wheel, the valve body being capable of containing fluids at pipeline pressures;
   installing an access valve on the access opening, the access valve having an open position and a closed position, objects can be passed through the access valve when in the open position;
   securing a cutting tower to the access valve, moving the access valve to the open position and lowering a drive linkage from the cutting tower through the access valve to engage the cutting wheel;
   driving the cutting wheel, by means of the drive linkage, to sever a section of the pipeline between the first face plate and the second face plate to form a first cut edge of the pipeline that is flush with a surface of the first face plate and a second cut edge of the pipeline that is flush with a surface of the second face plate;
   retracting the drive linkage into the cutting tower, pulling the cutting wheel and severed section of pipeline inside of the cutting tower;
   closing the access valve to enable the cutting tower to be removed;

installing a control section for the EFRD, with a control linkage for controlling a valve gate member, in place on the access valve, the control section comprising a converter flange from round to rectangular; and moving the access valve to the open position and lowering the valve gate member for the EFRD through the access valve into position to close the pipeline when/if required.

* * * * *